Oct. 23, 1962 E. F. WEBB 3,059,263
WINDSHIELD CLEARING SYSTEM
Filed May 2, 1958 2 Sheets-Sheet 2
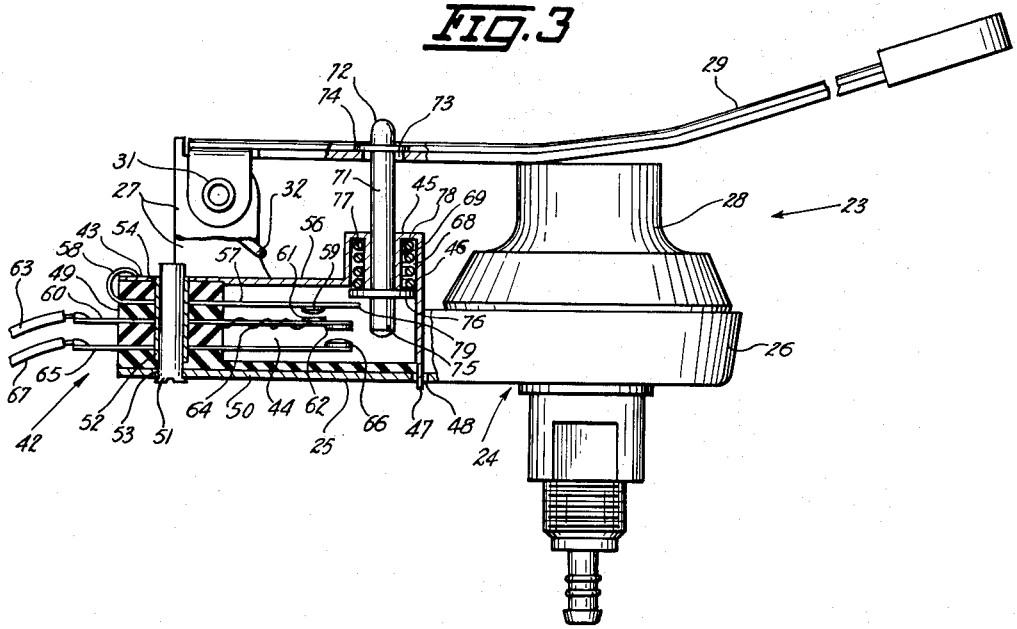
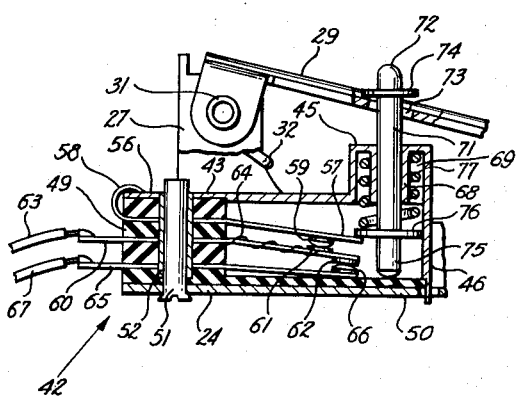
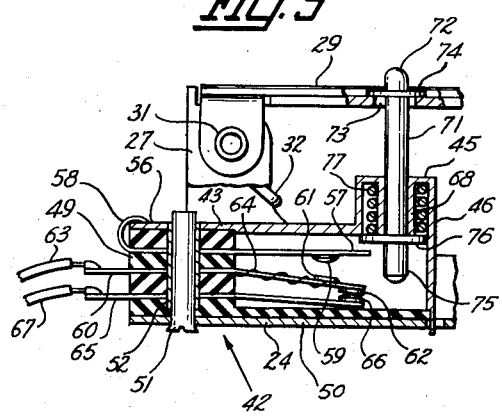
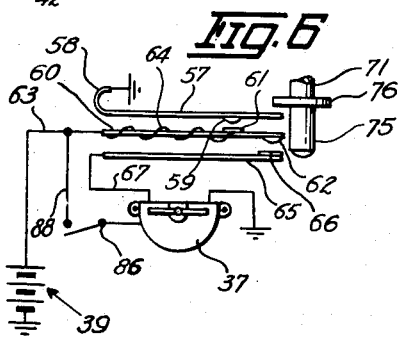
INVENTOR.
EDMOND F. WEBB
BY Sowell & Henderson
ATTORNEY.

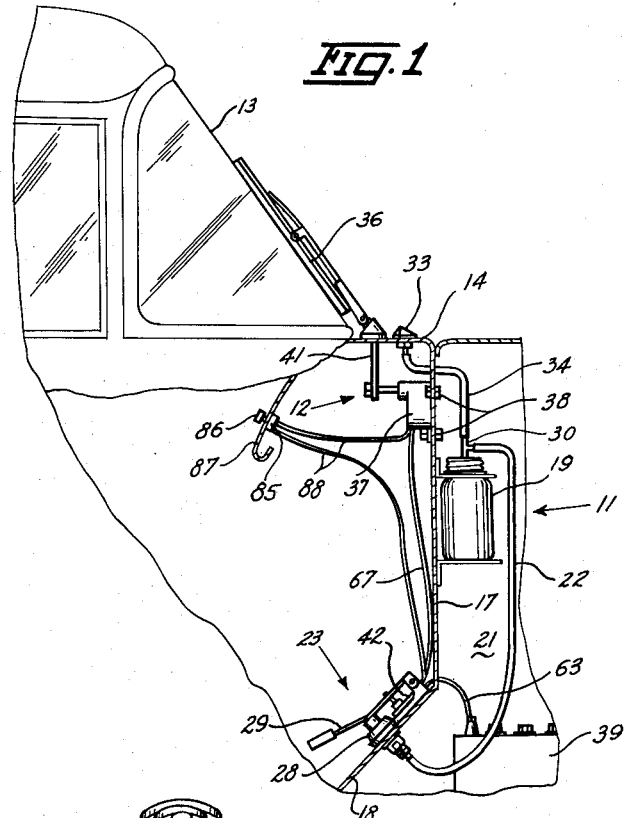

United States Patent Office 3,059,263
Patented Oct. 23, 1962

3,059,263
WINDSHIELD CLEARING SYSTEM
Edmond F. Webb, Franklin, Mich., assignor to The Delman Company, Cookeville, Tenn., a corporation of Tennessee
Filed May 2, 1958, Ser. No. 732,545
8 Claims. (Cl. 15—250.02)

This invention relates to vehicle windshield clearing systems and more particularly to a system providing for the concurrent operation of a wiper unit and a washer unit and for operation of the wiper unit independently of the washer unit.

An object of this invention is to provide in a windshield clearing system an improved arrangement for concurrent operation of a wiper unit and a washer unit.

Another object of this invention is to provide in a vehicle windshield clearing system, means operable by the vehicle operator for concurrent operation of a washer unit and a conventional electric wiper motor unit.

A further object of this invention is to provide in a vehicle windshield clearing system, means operable by the vehicle operator for initiating concurrently the operation of a washer unit and a wiper unit and for delaying the operation of the wiper unit after the operation of the washer unit has been stopped.

Yet another object to this invention is to provide in a windshield clearing system, foot operated means including a lever, the depressing of which simultaneously actuates a pump device and a switch device for the washer unit and the wiper unit respectively and the releasing of which de-actuates the washer unit and initiates a time delay for de-actuating the wiper unit Another object of this invention is to provide in a windshield clearing system, a time delay device for controlling the operation of a wiper unit, which forms part of a lever-type fluid pump assembly and the operation of which is dependent upon the operation of the pump assembly.

An object of this invention is to provide an arrangement for attaining the above mentioned objectives which is economical to manufacture, easy to install, and effective in service and operation.

These objects and other advantages will become readily apparent by reference to the following description when taken in conjunction with the accompanying drawing, wherein:

FIG. 1 is a foreshortened, fragmentary view of a vehicle showing the invention in assembled relation therewith;

FIG. 2 is an enlarged perspective view of the foot pump assembly of FIG. 1;

FIG. 3 is an enlarged, side elevational view of the foot pump assembly of FIG. 2, with the lever shown in a non-depressed position and having some parts broken away and other parts shown in section for the purpose of clarity;

FIG. 4 is a fragmentary partially sectional view similar to FIG. 3 and showing the position of the switch parts when the pump lever is depressed;

FIG. 5 is a fragmentary view similar to FIG. 4 and showing the position of the switch parts after the pump lever has been released from its depressed position; and FIG. 6 is a schematic wiring diagram of the electrical components for the system shown in FIG. 1.

With reference to the drawing, a vehicle windshield clearing system is disclosed which includes a windshield washer unit and a windshield wiper unit designated generally as 11 and 12, respectively. The vehicle is illustrated as having a windshield 13 and an engine cowl 14 extended forwardly of the windshield. The vehicle is further equipped with the usual upright firewall 17 and an upwardly and forwardly inclined floorboard or toeboard section 18 which joins with the lower end of the firewall 17.

The windshield washer unit 11 includes a fluid reservoir 19 mounted on the firewall 17 within the engine compartment 21 and communicating through a fluid line or hose 22 with a foot operated combination pump and switch assembly 23 clamped to the top side, and projected through the inclined floorboard section 18.

As best appears in FIG. 3, the combination assembly 23 generally includes a bracket mounting member 24 having a base 25 having a cup portion 26 at one end and a pair of upright leg portions 27 at its other end. Received in a nested relation within the cup portion 26 is a hollow rubber body or bellows type pump member 28 operatively associated with the reservoir 19 and a fluid nozzle 33. An operating lever 29, of an angulate shape in longitudinal section, is pivotally connected at one of its ends by a pivot 31 to the free or upper ends of the leg portions 27. The lever 29 operates on downward pivotal movement to collapse the bellows member 28 and thus expel fluid therefrom through the hose 22 and a hose 34 to the nozzle 33. A spring 32 mounted about the pivot 31 biases the lever member 29 upwardly whereby to raise the lever member from a depressed position to thus allow the bellows member 28 to expand and withdraw fluid from the reservoir 19 through the hose 22. A valve unit 30, interconnecting the hoses 22 and 34 and the reservoir 19, includes check valves (not shown) for controlling the flow of fluid therethrough in response to the reversed flow of fluid in the hose 22 as effected by the discharge and intake action of the pump member 28.

The nozzle 33 (FIG. 1) is attached to the cowl 14 at a position forwardly of the windshield 13, and is connected to the reservoir 19 through the fluid line or hose 34. On downward swinging movement of the lever 29, fluid under pressure is supplied to the nozzle 33 for discharge upwardly onto the windshield 13 and into the path of movement of a windshield wiper 36, which forms part of the windshield wiping unit 12.

The wiper unit 12 also includes an electric wiper motor 37 of a conventional type mounted by means of bolts 38 to the firewall 17. A battery 39 is provided for supplying energy to the wiper motor 37, thereby enabling the wiper motor to drive the wiper blade 36 in an oscillating manner, by means of a usual transmission mechanism indicated generally at 41 (FIG. 1).

The combination pump and switch assembly 23 is shown as including a thermostatic time delay switch unit, designated generally as 42 in FIGS. 2 and 3. The switch unit 42, connected in circuit with the battery 39 and the wiper motor 37, is adapted to turn on the wiper motor 37 concurrently with the downward movement of the lever member 29 to actuate the washer unit 12. While the lever member 29 is in a depressed position, the switch unit 42 is conditioned to initiate a time delay action so that the wiper motor 37 continues to operate for a time interval after the lever has been released to stop the operation of the washer unit 11.

The switch unit 42 comprises a casing 43 of an inverted U-shape in transverse section having depending leg portions 44 (FIG. 2), a connecting top portion 56, and an upright tubular projection 45 at one end of the top 56 which has a depending portion 46 extended through an opening 48 (FIG. 3) provided in the mounting bracket 24. A switch body 49, of molded styrene or the like, is secured between the leg portions 44 at the other end of the top 56, and includes a flat base portion 50 extended along the surface of the bracket 24 and joined to the depending portion 46. A rivet member 51 is inserted through an insulator bushing 52 mounted in the switch body 49 and extends through an opening 53 provided in the mounting bracket 24 and an opening 54 provided in the top portion 56 of the casing 43, whereby to secure the casing 43 and the switch body 49 to the mounting bracket 24.

Three vertically spaced blade units 57, 60 and 65 are extended each in a horizontal manner through the switch body 49 so that one of their end portions are within the confines of the casing 43 and their opposite ends project outwardly from the casing. Openings (not shown) are provided in each of the blade units 57, 60 and 65 for receiving the insulator bushing 52. The uppermost blade unit 57 has its projected end portion 58 reversely curved against the outside of the casing 43, and has additionally a downwardly faced contact 59 on the end thereof within the casing 43. This blade unit 57 for convenience of description will be designated hereinafter as the ground blade.

The intermediate blade unit 60 on the end portion thereof within the casing 43 includes a first contact 61 which is insulated from the blade 60 and adapted to engage the contact 59, and a second contact 62 faced downwardly. The projected end of the blade unit 60 is connected to a lead 63 extending to and connected to the battery 39. This blade unit 60 will be designated hereinafter as the battery blade. An insulated resistance wire 64, within the casing 43, is wrapped about the battery blade 60 with one end connected to the blade 60 and its other end connected to the contact 61. The battery blade is of a bimetal type so as to be thermal responsive to the heat generated by the resistance 64, for a purpose to appear later.

The lower blade unit 65, within the casing 43, has a contact 66 engageable with the contact 62 on the battery blade 60, and has its projected end connected to a lead 67 from the wiper motor 37. This blade unit 65 will hereinafter be designated the control blade.

The upright tubular portion 45 includes a central bore or hub section 68 (FIG. 3) which forms a circular cavity 69 within the portion 45. An elongated contact plunger member 71, reciprocally movable within the bore section 68 has its upper end 72 extended through an elongated slot 73 formed intermediate the ends of the lever member 29 (FIG. 2). A clip member 74 secured to the upper end 72 of the member 71 is engageable with the top side of the lever 29 and is of a size to cover the slot 73. The lower end 75 of the plunger member 71 carries a washer 76 of a lateral extent sufficient to cover the circular cavity 69. A coil spring 77, mounted in the cavity 69, is maintained under compression between the top side 78 of the tubular portion 45 and the washer or shoulder member 76 of the plunger member 71.

By this arrangement, the coil spring 77 biases the plunger member 71 downwardly to maintain the clip member 74 in contact engagement with the top side of the lever member 29. The washer 76 is of a size such that upon a downward movement of the plunger member 71, it contacts the inner end 79 of the ground blade 57, thus forcing the contact 59 of the ground blade against the contact 61 of the battery blade 60. Additionally, the lower contact 62 of the battery blade 60 is forced against the contact 66 of the control blade 65. It is seen, therefore, that upon a downward movement of the plunger member 71, all three blade units 57, 60 and 65 are forced into a contacting position, each with the next adjacent blade unit.

Let it be assumed that the pump and switch assembly 23 are in their positions shown in FIG. 3 corresponding to an inactive or rest condition of the windshield clearing system. In this position the lever member 29 is in a normally raised or released position and the thermostatic time delay switch unit 42 is in a position to open the circuit to the wiper motor. To actuate the wiper and washer units, the lever member 29 is moved downwardly by the vehicle operator's foot whereby to depress the bellows member 28 and force fluid therefrom through the hoses 22 and 34 and out through the nozzle 33 to the windshield 13.

On downward movement of the lever member 29, the coil spring 77 in the tubular portion 45 moves the contact plunger 71 whereby the washer 76 is moved into engagement with the ground blade 57 (FIG. 4) which is deflected downwardly against the battery blade 60, which in turn is deflected against the control blade 65. In other words the blades 57, 60 and 65, in such order, are successively moved into engagement with each other. On engagement of the contacts 62 and 66, the wiper motor circuit is closed whereby electrical energy from the battery 39 passes through the leads 63 and 67 to the wiper motor. Thus, concurrently with the downward movement of the lever member 29 to actuate the washer unit 11, the switch unit 42 actuates the wiper unit 12. Also, on engagement of the contacts 59 and 61 on the ground blade 57 and the battery blade 60, respectively, a circuit is formed from the battery 39 through the resistance unit 64 to ground, whereby the resistance unit 64 produces heat to raise the temperature of the battery or bimetal blade 60.

On being released, the lever member 29 is raised by the biasing spring 32, and the pump bellows member 28 is permitted to expand to take in fluid from the reservoir 19. Concurrently with the upward movement of the lever member 29 the contact plunger 71 is raised against the action of the spring 77, by virtue of the clip member 74 with the top side of the lever. This upward movement of the contact plunger 71 permits the ground blade 57 to assume its initially horizontally disposed position whereby to break the contact between the contacts 59 and 61 (FIG. 5), thus cutting off current to the resistance wire 64 and in turn the application of the heat from the resistance 64 to the battery blade 60. The construction of the blade 60 is such that on being heated it retains a position deflected toward and against the lower or control blade 65. As a result, on opening of the contacts 59 and 61, the battery blade 60 remains deflected toward the control blade 65 to close the contacts 62 and 66. However, since the circuit of the resistance 64 has been broken, the battery blade 60 is allowed to cool and thus progressively return to its normal horizontally disposed position. Thus, the upward movement of the lever member 29, to stop the washer unit 12, concurrently initiates the time delay operation of the switch unit 42 to continue the operation of the wiper unit for a predetermined interval of time subsequent to the ceasing of operation of the washer unit 11.

Of note, the wiper motor 37 may be operated independently of the washer unit 11. A conventional on-off switch unit 85 having a control knob 86 may be mounted on the vehicle dash panel 87 and connected in the electrical circuit by a lead 88 (FIG. 6) between the battery 39 and the motor 37. Thus, operation of the wiper unit 12 may be either independently of or concurrently with operation of the washer unit 11.

Although a preferred embodiment of the invention has been disclosed herein, it is not to be so limited as various modifications and alternate constructions may be made therein which are within the full intended scope of the invention as defined in the appended claims.

I claim:

1. A vehicle windshield clearing system comprising, a nozzle device for spraying a fluid onto the windshield, reservoir means fluid connected with said nozzle device for holding a supply of fluid, foot operated pump means fluidally connected with said reservoir means and alternately operable to withdraw fluid from said reservoir means and to force fluid through said nozzle device, an electrically operable windshield wiper motor, an electric circuit for said motor, and electrical time delay means mechanically connected with said pump means and electrically connected in said wiper motor circuit, said time delay means including heat responsive means operable to start said wiper motor concurrently with the operation of said pump means to force fluid through said nozzle device, and to stop said wiper motor subsequently to the said fluid forcing operation of said pump means.

2. A vehicle windshield clearing system comprising, a nozzle device for spraying a fluid onto the windshield, a fluid reservoir means, pump means fluidally connected with said reservoir means and nozzle device and including a lever member movable between two positions whereby said pump means is alternately operated to withdraw fluid from said reservoir means and to force fluid through said nozzle device, an electrically operable windshield wiper motor, a circuit for said motor including thermostatic time delay switch means for starting and stopping said wiper motor, said switch means having coacting contact members resiliently movable from a first position wherein said wiper motor is controlled to start immediately, to a second position wherein said wiper motor is controlled to stop at an interval of time after said second position is attained, and means operatively connected to said switch means including an element biased in one direction whereby to force said switch means to said first position, and wherein said element is mechanically connected to said lever member to release said switch means to attain said second position when said pump means is withdrawing fluid.

3. A vehicle windshield clearing system comprising, a nozzle device for spraying a fluid onto the windshield, fluid reservoir means, foot-operated pump means fluidally connected with said reservoir means and nozzle device and alternately movable between an intake position wherein fluid is withdrawn from said reservoir means and a discharge position wherein fluid is forced through said nozzle device, an electric windshield wiper motor, a circuit for said motor, a time delay means including conductor elements, one of which is of a bimetal structure and has a resistance unit secured thereto, said elements and said unit connected in said circuit and deflectable to a first position to start said motor and resiliently movable to a second position to stop said motor at a predetermined interval of time after the pump means is in said intake position therefor, and means mechanically connected to said pump means and operable upon movement of said pump means to said discharge position to move independently of said pump means to a position forcing said switch elements to said first position, said mechanically connected means then movable with said pump means to said intake position to withdraw from said elements to allow said elements to resiliently move from said first position to said second position therefor.

4. A vehicle windshield clearing system comprising, a nozzle device for spraying a fluid onto the windshield, a reservoir fluid connected with said nozzle device, a foot operated pump assembly fluidally connected with said reservoir and nozzle device and including pivotal means movable between a pump assembly non-actuated position and a pump assembly actuated position wherein fluid is discharged from said nozzle device, a windshield wiper motor, an electric circuit for operating said wiper motor, and time delay means interposed in said electric circuit for controlling the flow of power therethrough, said time delay means including heat responsive means operable in a first position to close said circuit and in a second position to open said circuit after an interval of time subsequent to the attainment of said second position, said heat responsive means responsive to said pivotal means upon a movement thereof to said actuated position whereby to attain said first position, and connectible with said pivotal means upon a movement thereof to said non-actuated position whereby to attain said second position.

5. A vehicle windshield clearing system comprising, a nozzle device for spraying a fluid onto the windshield, a reservoir fluid connected with said nozzle device, foot operated pump means fluidally connected with said reservoir and nozzle device and including pivotal means movable from a raised position to a depressed position for discharging said fluid through said nozzle device, a wiper motor, an electric circuit including a power source for said motor, and a thermostatic time-delay switch means connected in said circuit for control of said wiper motor, said switch means including an element biased for movement to a first position concurrent with movement of said pivotal means into said depressed position, whereby said element operates said switch means to close said circuit, said element connectible with said pivotal means for movement therewith to a second position upon movement of said pivotal means from said depressed position to said raised position, whereby said element operates said switch means to initiate a time-delay action thereof for opening said circuit.

6. A vehicle windshield clearing system comprising, a nozzle device for spraying a fluid onto the windshield, a reservoir fluid connected with said nozzle device, a foot-operated pump assembly including a mounting device, a bellows unit mounted at one end of said mount-connected to said lever means, whereby when said bellows said nozzle device, a lever pivotally connected to said mounting device at the other end thereof and movable from a raised position to a depressed position wherein said bellows unit is depressed to force fluid through said nozzle device, means biasing said lever toward said raised position, an electric wiper motor, a circuit for said motor, and thermostatic switch means connected in said circuit for opening and closing said circuit, said switch means supported on said mounting device and including a bimetal blade unit adapted to form a thermoelectric couple, an element reciprocally movable relative to said blade unit, means biasing said element into a position contacting said blade unit wherein said thermoelectric couple is formed concurrent with movement of said lever to a depressed position, and means connecting said element to said lever so that upon movement of said lever to said raised position said element is withdrawn from said blade unit contacting position.

7. In a vehicle windshield system including an electrically operated wiper unit and a manually operated washer unit, a foot operated pump and switch assembly adapted for concurrent operation of said units and for a delayed operation of said wiper unit relative to said washer unit, said assembly comprising, mounting means, a bellows pump means secured to said mounting means, lever means pivotally connected to said mounting means for depressing said bellows pump means, electric switch means secured on said mounting means and connected in series with said wiper unit, said switch means including a plurality of spaced conductor blades one of which is bimetal, a resistance unit connected to said bimetal blade, a plunger element adapted to contact and force said blades together, and spring means biasing said plunger element toward said blade contact, said element operatively connected to said lever means, whereby when said bellow means is non-depressed said element is held by said lever means in a blade non-contacting position, and when said bellows means is depressed said element is free of said lever means and subject to said biasing means.

8. In a vehicle windshield system including an electrically operated wiper unit and an operator actuated washer unit, a pump and switch assembly comprising, mounting means, a resilient bellows pump means secured to said mounting means, a lever member pivotally connected to said mounting means and having an elongated slot formed therein substantially intermediate the ends thereof, said lever member biased to a position wherein said bellows means is expanded and movable to another position wherein said bellows is depressed, an electrically operated wiper motor, switch means mounted on said mounting means and including a trio of conductor elements flexibly mounted in spaced relation, a first of said elements electrically connected to a ground, a second element of a bimetal structure and electrically connected to a source of electrical energy, a third element electrically connected to said wiper motor, a resistance unit electrically connected to said source and mounted on said second element, said first element adapted to contact said resistance unit, said second element adapted to contact said third element, a contact plunger reciprocally mounted relative to said switch means and having one end adapted to contact and deflect said first element against said second element and to force said second element against said third element, the other end of said contact plunger projected through said slot, means mounted relative to said switch means for biasing said contact plunger one end toward said element contacting position and away from said lever member, and means secured to said other end of said contact plunger and engageable with the side of said lever member opposite said biasing means.

References Cited in the file of this patent

UNITED STATES PATENTS

| | | |
|---|---|---|
| 1,581,714 | Appelberg | Apr. 20, 1926 |
| 2,743,473 | Oishei | May 1, 1956 |
| 2,772,332 | Carlson | Nov. 27, 1956 |
| 2,816,316 | Oishei | Dec. 17, 1957 |
| 2,827,652 | Oishei | Mar. 25, 1958 |
| 2,873,467 | Oishei | Feb. 17, 1959 |
| 2,877,485 | Oishei | Mar. 17, 1959 |